United States Patent [19]
Boggs

[11] Patent Number: 5,406,030
[45] Date of Patent: Apr. 11, 1995

[54] HIGH VOLTAGE, HIGH-CURRENT POWER CABLE TERMINATION WITH SINGLE CONDENSER GRADING STACK

[75] Inventor: Steven A. Boggs, Toronto, Canada

[73] Assignee: Electric Power Research Institute, Palo Alto, Calif.

[21] Appl. No.: 996,883

[22] Filed: Dec. 28, 1992

Related U.S. Application Data

[63] Continuation of Ser. No. 573,640, Aug. 24, 1990, abandoned.

[51] Int. Cl.[6] .................... H02G 15/30; H02G 15/072
[52] U.S. Cl. .................... 174/73.1; 174/19; 174/143
[58] Field of Search .................... 174/73.1, 15.3, 18, 174/19, 80, 143, 74 R, 75 R, 75 D, 80

[56] References Cited

U.S. PATENT DOCUMENTS

| | | | |
|---|---|---|---|
| 2,912,480 | 11/1959 | Johnston et al. | 174/31 |
| 3,193,712 | 6/1965 | Harris | 174/143 X |
| 3,673,305 | 6/1972 | Mashikian et al. | 174/12 BH |
| 4,179,582 | 12/1979 | Garcia | 174/73.1 x |
| 4,228,318 | 10/1980 | Selsing | 174/73.1 |
| 4,262,318 | 4/1981 | Shirakawa et al. | 361/127 |

OTHER PUBLICATIONS

Electrical World (EHV Cable Systems) May 1, 1961, p. 52.

*Primary Examiner*—Leo P. Picard
*Assistant Examiner*—Hyung S. Sough
*Attorney, Agent, or Firm*—Curtis, Morris & Safford

[57] ABSTRACT

A high voltage cable termination for connecting a high voltage cable of the type having internal and external electric fields to other apparatus, such as an overhead line, is provided. An insulating shell surrounds the cable which is provided with a high voltage conductor surrounded by a cable dielectric. The termination includes a common condenser assembly for grading the electric fields of the cable which assembly includes a cylindrical condenser stack of restricted length surrounding the high voltage conductor to grade the internal longitudinal electric field in the dielectric surrounding the high voltage conductor. In one embodiment, the common condenser assembly includes conductive shields connected between the condenser stack and the insulating shell to grade the external electric field along the insulating shell and in the surrounding environment by tapping different voltages produced along the condenser stack to locations along the insulating shell. In another embodiment, the conductive shields are omitted and the condenser elements of the condenser assembly are axially distributed and separated by conductive segments.

38 Claims, 14 Drawing Sheets

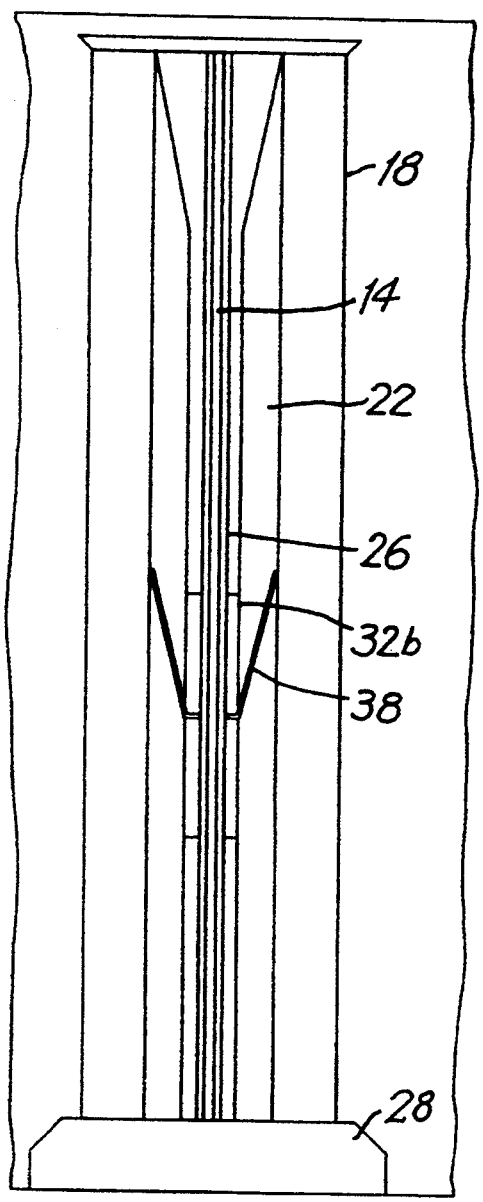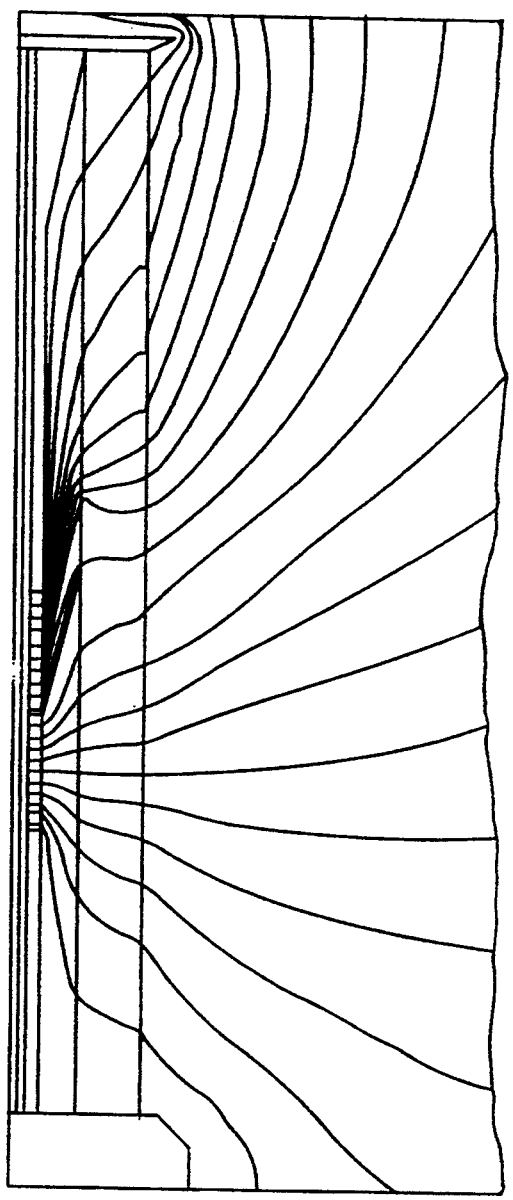

FIG. 19
FIG. 20
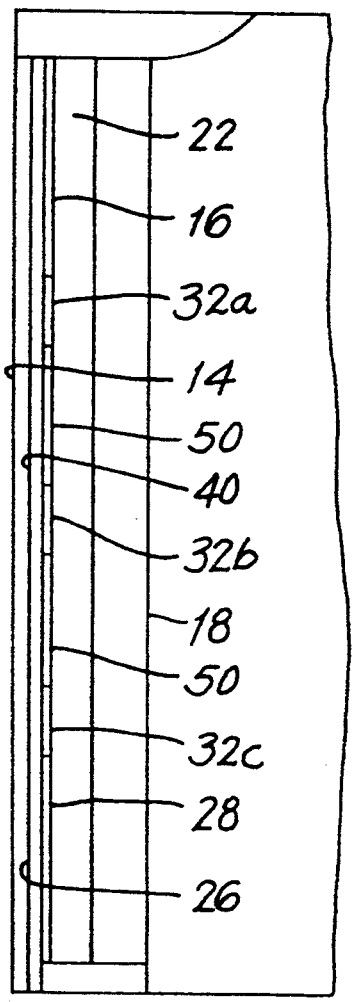
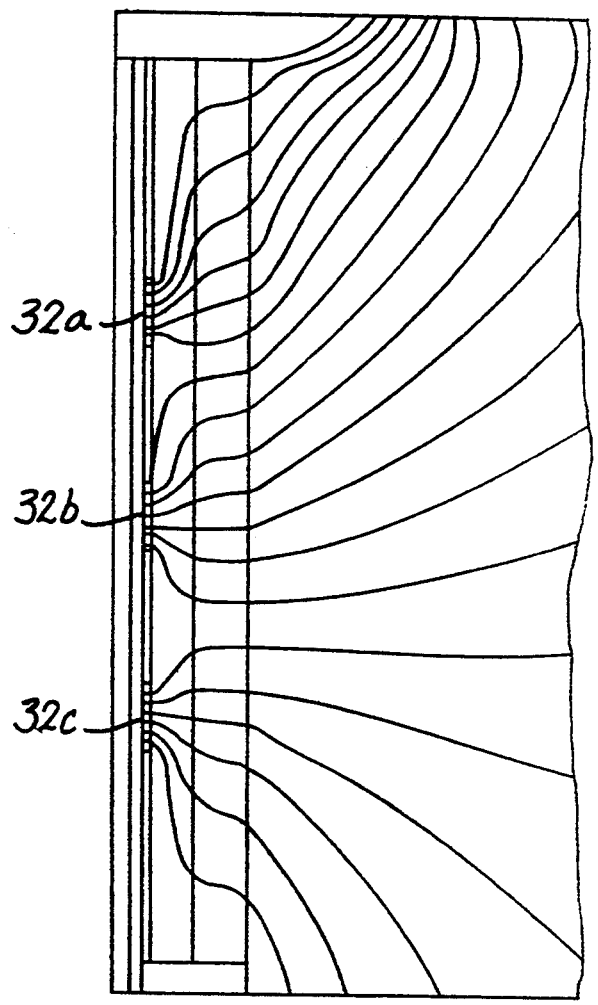

HIGH VOLTAGE, HIGH-CURRENT POWER CABLE TERMINATION WITH SINGLE CONDENSER GRADING STACK

This application is a continuation of application Ser. No. 07/573,640, filed Aug. 24, 1990, is now abandoned.

BACKGROUND OF THE INVENTION

This invention relates to a high voltage cable termination, and more particularly, to a connection interface for connecting power transmission cable to other apparatus such as an overhead electric power transmission line, gas-insulated substation, or oil-insulated power transformer.

A cable used for transmitting electric power must be connected to other elements of the electric power system to be useful. This usually involves transitions between the cable and air-insulated, $SF_6$-insulated, or other fluid dielectric-insulated components. In an underground electric power cable, the high voltage conductor and the concentric grounded shield are separated at most by a few centimeters of dielectric, usually a dielectric fluid impregnated paper or paper-polypropylene (PPP) laminate (both cases are known as laminar dielectric cable), or by an extruded solid dielectric such as cross-linked polyethylene (XLPE), thermoplastic polyethylene (PE), or a filled ethylene propylene rubber (EPR).

The very large electric field in an electric power cable is radial, between the high voltage conductor and the concentric ground shield. The electric fields at which power cables operate are among the highest of any power system components. To connect such a power cable to external apparatus, such as air-insulated, $SF_6$-insulated, or bulk oil-insulated apparatus (all of which support lower electrical stresses than those caused by the electric field of a typical power cable), the ground of the cable must be spaced from the cable conductor sufficiently far and in such a manner that where the cable is connected to the apparatus, the dielectric fluid which insulates the apparatus can withstand the electrical stresses imposed by the cable termination between its high voltage terminal and ground. This requires increasing the spacing between the conductor and the ground from a few centimeters in the cable to the range of meters in the case of a transition to air-insulated apparatus. For example, if a high voltage cable were to be terminated by simply cutting it perpendicular to its length, the high voltage conductor would be separated from the ground shield by only a few centimeters across the surface of the cut dielectric. At the electrical stresses employed in high voltage power cable, the air, oil, $SF_6$, or other fluid dielectric along this surface would suffer dielectric breakdown at a fraction of the voltage on the conductor. If the coaxial ground shield were terminated with a circumferential cut and the dielectric and conductor were extended some distance beyond, the termination may fail. The electric field at the edge of the shield termination would be so high as to cause short-term failure of the cable dielectric. In addition, unless the conductor extended a very large distance beyond the shield termination, the breakdown of the dielectric fluid adjacent to the shield termination would lead to breakdown between the shield and the conductor along the surface of the cable dielectric.

Laminar dielectrics, in particular, have very high dielectric strength (i.e., they support very large electric fields) in the radial direction (i.e., perpendicular to their surface) but have comparatively low dielectric strength in the longitudinal direction (axially, or along their surface). A longitudinal component of the electric field is an inevitable result of any attempt to increase the separation between the conductor and ground. Thus for laminar dielectric cables, the means for achieving the necessary separation between the conductor and ground shield requires careful design to assure that the longitudinal component of the electric field does not exceed a safe value.

Electric power cables are used to transfer large amounts of electrical power by conducting large electric currents at high voltages. Cable conductors, such as copper and aluminum, have electrical resistance, and cable dielectrics have dielectric losses, all resulting in substantial amounts of heat being generated per unit length of cable. The laminar or extruded dielectric of a power cable has limited ability to operate at high temperatures. The ultimate limit on the power transfer of a power cable system is normally the maximum allowable temperature of the cable dielectric, above which the operating life of the cable degrades rapidly. A power cable system is designed so that at its rated power, the heat generated by the cable can be dissipated safely into the soil in which the cable is buried without exceeding the maximum allowable temperature for the cable dielectric. However, the cable termination represents a thermal environment which differs substantially from that in which the majority of the cable operates. The elements of a conventional cable termination act as a substantial thermal resistance between the cable conductor within the termination and the exterior environment in which the heat must be dissipated.

The prior art has long been aware of the need for care in the design of high voltage cable terminations (or potheads). Conventional transmission-class power cable pothead designs usually employ two separate mechanisms for the purposes of (1) expanding the distance between the cable conductor and ground while limiting the longitudinal component of the electric field and (2) creating an acceptably uniform electric field along the exterior surface of the termination between the high voltage conductor and ground.

Conventional cable termination designs for laminar dielectric cables expand the cable shield diameter over a built-up section of cable dielectric (a "stress cone" in language of those of ordinary skill in the art) in order to decrease gradually the electric field in the cable dielectric and create a manageable and substantially constant longitudinal component of the electric field in the region of the stress cone. For laminar dielectric cables, the stress cone typically is implemented through the use of an oil-impregnated paper roll with a "log-log" taper at one end. This roll is tightened over the cable dielectric, and the concentric ground shield is arranged to expand over the log-log taper to increase the separation between the conductor and the shield while creating a safe and nearly constant longitudinal component of the electric field. This mechanism achieves an acceptable electric field configuration at the termination of the ground shield. However, manufacture of the log-log taper on a very large paper roll is difficult and risky. Moreover, installation of the very large paper roll without distorting the log-log taper is very difficult, and even slight distortions can cause failure of the termination. In addition to the stress cone, another device in the form of a capacitor stack connected between the high voltage terminal and ground and placed along the inner surface of the cable termination enclosure (usually porcelain), is often used to achieve acceptable electric field grading at the external surface of the termination. Since, in principle, a capacitor stack provides nearly uniform grading of the electric field between its ends, a capacitor stack might be connected from the termination of the ground shield to the cable conductor at the top electrode of the termination to achieve the dual purposes of uniform field grading at the external pothead surface and establishing a very well controlled longitudinal electric field within the cable dielectric. However, conventional wound capacitor technology results in an electric field which changes rapidly over short distances along the stack rather than continuously along its length. In conventional cable terminations, such a step-wise grading is sufficiently "smoothed" by the high dielectric constant and thickness of the porcelain enclosure to provide acceptable grading in the fluid dielectric (e.g., air) along the exterior surface of the cable termination; however, such substantially step-wise grading will result in unacceptable longitudinal stresses along the cable surface of the stress cone and within the dielectric of a laminar cable dielectric.

One solution to the dual problems of controlling longitudinal electric field in the dielectric and controlling the electric field in the air along the exterior surface of a cable termination is described in U.S. Pat. No. 4,179,582 to Garcia. This patent suggests the use of the conventional stacked capacitor grading to control the electric field along the exterior surface of the termination. Moreover, rather than use a paper roll with a log-log taper, Garcia suggests the use of a "short-stack" of capacitors constructed so as to provide uniform (as opposed to stepwise) longitudinal grading, although the nature of the capacitors appropriate to the task is not discussed. This design is relatively expensive to manufacture and assemble and, moreover, is highly labor intensive because of the need to build the termination on site.

OBJECTS OF THE INVENTION

Therefore, one object of the present invention is to provide a high voltage cable termination which avoids the aforementioned disadvantages of the prior art.

Another object of the present invention is to provide an electric power cable-to-fluid dielectric termination which not only withstands the high dielectric stress within the cable and stress cone in the radial direction, but also withstands the stress in the axial direction.

A further object of the present invention is also to provide a cable-to-fluid dielectric termination which provides effective control of the axial and radial field in the stress cone region of the cable.

A further object of the present invention is to provide a cable-to-fluid dielectric termination which prevents air or other fluid dielectric breakdown resulting from the relatively high electric field along the external shell of the termination.

Yet a further object of the present invention is to provide a cable-to-fluid dielectric termination which has a single condenser arrangement to grade both the internal and the external electric fields of the termination.

Another object of the present invention is to provide a cable-to-fluid dielectric termination which is relatively inexpensive to manufacture and is less labor intensive to assemble.

Various other objects, advantages, and features of the present invention will become readily apparent from the ensuing detailed description, and the novel features will be particularly pointed out in the appended claims.

SUMMARY OF THE INVENTION

A high voltage cable termination for connecting an insulated high voltage cable to fluid insulated electrical apparatus such as an overhead line is provided. An insulating shell surrounds the cable which includes a high voltage central conductor and a cable dielectric that provides a surrounding insulation for the central conductor. The termination includes a common condenser assembly for reactive grading of the longitudinal electric fields in the cable dielectric between the conductor and ground, the condenser assembly being formed as a cylindrical multi-element condenser stack of restricted length surrounding the high voltage conductor and cable dielectric. In one embodiment, the common condenser assembly includes conductive conical shields which are connected between elements of the condenser stack and project radially to the vicinity of the insulating shell to grade the electric field along and in the vicinity of the external surface of the insulating shell. The conductive shields are formed of a plurality of generally conical shields whose electrical potentials are defined by the reactive grading of the condenser stack. Each of the conical shields taps a voltage approximately proportionate to its position along the condenser stack and conducts this potential to a location along the insulating shell so as to grade the electric field along the internal and, more importantly, the external surface of the insulating shell and in the surrounding environment outside the shell.

In another embodiment, segments of the condenser stack are separated by conducting segments such that the elements of the condenser stack are positioned over the axial length of the termination, whereby an approximately uniform electric potential distribution along the exterior surface of the insulating shell is obtained.

In both embodiments, the usual capacitor stack heretofore provided along the inner surface of the termination enclosure is eliminated. Thus, the present invention reduces the thermal resistance between the cable conductor within the termination and the external environment to which heat generated within the termination must be conducted. Advantageously, the metallic conical shields in one embodiment act as heat-radiating fins to transfer heat from the region of the cable conductor to the region of the termination enclosure from where it is conducted or radiated to the external environment. The relatively large volume of fluid dielectric within the cable termination which results from the elimination of the outer capacitor stack also facilitates convective heat transfer from the region of the cable conductor to the termination enclosure.

BRIEF DESCRIPTION OF THE DRAWINGS

The following detailed description, given by way of example but not intended to limit the invention solely to the specific embodiment described, may best be understood in junction with the accompanying drawings in which:

FIG. 2 is a sectional view of a particular example of the present invention for terminating a 138 kV cable;

FIGS. 3–5 are graphical representations of field and potential along the cable termination shown in FIG. 2;

FIG. 19 is a sectional view of another example of a dielectric configuration of the FIG. 14 embodiment for terminating a 230 kV cable;

FIGS. 20–22 are graphical representations of field and potential along the cable termination shown in FIG. 19;

DETAILED DESCRIPTION OF PREFERRED EMBODIMENTS

Figure 1:
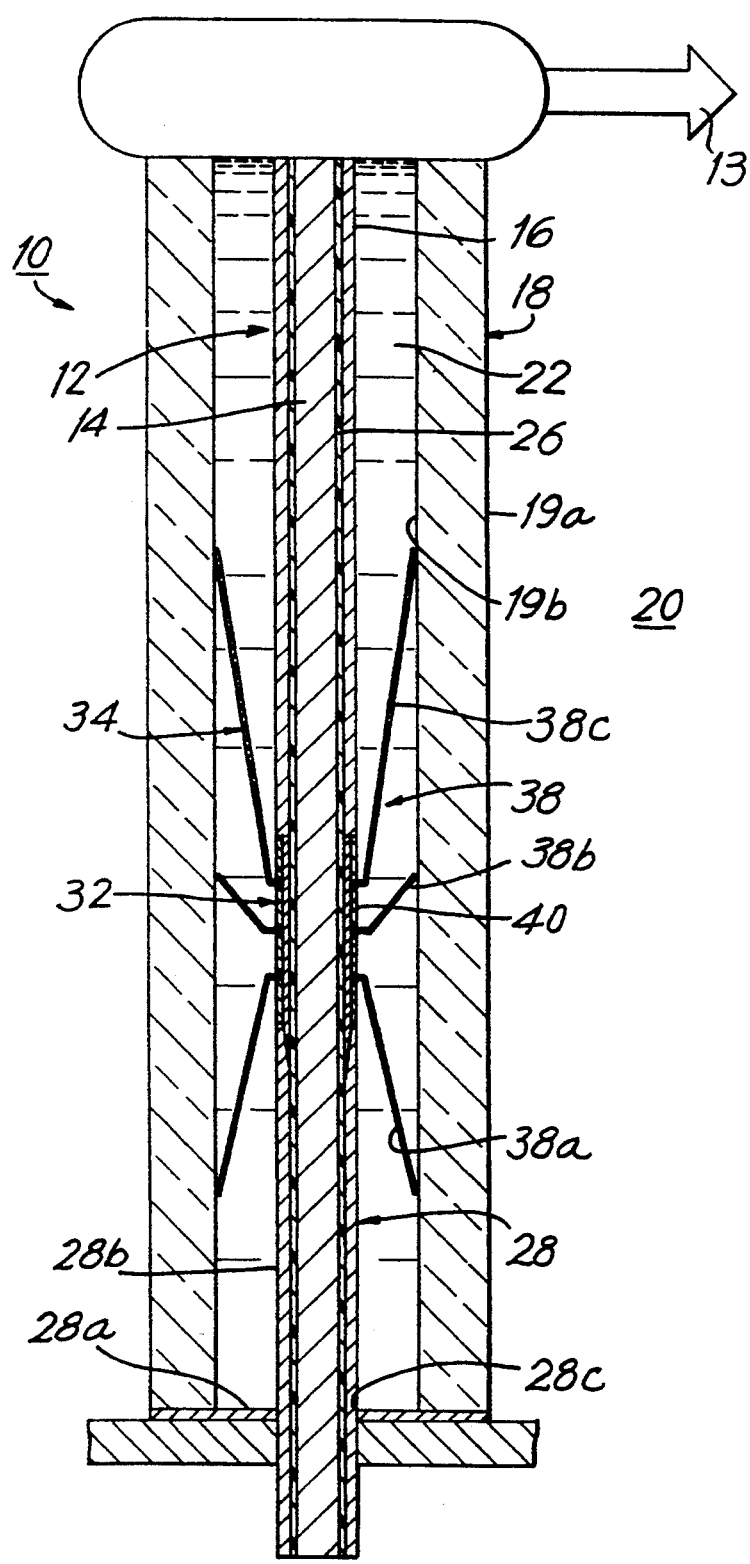
FIG. 1 is a cross-sectional side elevational view of one embodiment of the cable-to-fluid dielectric termination in accordance with the present invention.

Referring initially to FIG. 1, a high voltage cable termination 10 (or pothead) is provided which connects a high voltage cable conductor 14 to, for example, an overhead line 13. The high voltage termination includes a conductor assembly 12 comprised of an inner cylindrical conductive member 14, such as a stranded conducting cable, a cable dielectric 26, and an outer cylindrical conductive member 16 surrounding the inner cylindrical conductive member 14 and cable dielectric 26 along a portion thereof. The inner cylindrical conductor member 14, along with the cable dielectric 26 and a cable ground shield 28, extend into the ground soil. An external insulating shell 18, formed preferably of ceramic, porcelain, polymer cement, or a fiberglass tube coated with an appropriate dielectric surface, surrounds the conductor assembly and has an exterior surface 19a which communicates with the surrounding environment 20. Shell 18 also has an interior surface 19b. A dielectric fluid layer 22, which may be an oil layer mixed with a solid dielectric filler, is disposed between the interior surface 19b of insulating shell 18 and an exterior surface 24 of the outer cylindrical conductive member 16. Cable dielectric 26 is generally cylindrical and sandwiched between inner and outer cylindrical conductive members 14 and 16. Preferably, the cable-dielectric is a dielectric fluid impregnated paper, paper-polypropylene (PPP) laminate, or an extruded solid dielectric. An internal electric field is established in the cable dielectric in combination with insulation 40, to be explained in more detail below.

Cable ground shield 28 continues through a bottom plate 28a of the pothead, positioned for example on a grounded stand 30. A flange portion 28b extends upwardly from the bottom plate 28a between cable ground shield 28 and oil layer 22. An aperture 28c is provided within the cable ground shield 28 for providing an opening to receive the inner cylindrical conductive member 14, the cable dielectric 26, and the cable shield 28.

In furtherance of an aspect of the present invention, the illustrated cable termination is provided with a single cylindrical condenser stack arrangement 32 which grades the electric field both internal and external to the high voltage cable dielectric. This common condenser stack is of restricted length surrounding insulation 40 (which is formed of paper, PPP, thin plastic film, or a porous insulation structure), the dielectric 26 and the inner cylindrical conductive member 14, and separates axially the outer cylindrical conductive member from the cable ground shield. For example, the condenser stack is vertically positioned below the outer cylindrical conductive member 16 and above the upwardly extending flange portion 28b of the cable ground shield 28 (as viewed in FIG. 1).

The cylindrical condenser stack 32 grades the axial electric field between the outer cylindrical conductive member 16 or the cable conductor 14 and-the-cable ground shield 28. In the illustrated embodiment, in order to grade the external electric field along the insulating shell 18 and in the surrounding environment 20, this condenser assembly includes at least one, and preferably plural, conductive shields 38 connected between the condenser stack 32 and extending to or near to the inner surface of the insulating shell 18. The conductive shields 38 are formed of a plurality of generally conical shields, such as 38a, 38b and 38c, that may be of solid or mesh-like construction, each connected between the cylindrical condenser stack 32 and extending through the oil layer 22 to or near to the inner surface of the insulating shell 18. If solid, the conical shields, such as 38a, 38b, and 38c, are likely to be perforated to allow convection of the fluid insulating medium within the termination to facilitate improved heat transfer from the region of the cable conductor and condenser stack to the outer surface of the termination.

Each of the conical shields 38a, 38b and 38c taps a proportionate different voltage produced along the condenser stack 32 to locations along the insulating shell so as to grade the external electric field. For instance, the conical shield 38a taps approximately 25% of the maximum conductor voltage to a location that is approximately ¼ the length of the insulating shell. The conical shield 38b taps approximately 50% of the maximum conductor voltage to a location that is approximately ½ the length of the insulating shell. Finally, the conical shield 38c taps approximately 75% of the maximum conductor voltage to a location that is approximately 18¾ the length of the insulating shell. This ensures close to uniform grading of the external electric potential from 0% to 100% at the outer surface of the insulating shell. Accordingly, a segmented condenser stack 32 is provided which effects substantially continuous grading between the cable ground shield and the high voltage conductor over a length necessary to limit the axial electric field in the cable dielectric to an acceptable value, for example, on the order of about 2.7 kV/mm for laminar dielectric cables at the basic insulation level (BIL) rating of the cable. The condenser elements may be fabricated of a material with a high effective dielectric constant (e.g., a ceramic capacitor element), and may be fabricated using a "stack layer"

film condenser topology, or any topology which gives continuous or nearly continuous grading.

A thin layer of applied insulation 40 with short "log-log" slope is concentrically disposed between the cable dielectric 26 and the condenser stack 32 and wound around the cable dielectric to size the cable ground shield to the condenser stack. That is, the applied insulation 40 effectively "expands" the grounded cable shield 28 to the inside diameter of the condenser stack so that the inside diameter of the condenser elements does not have to match exactly the diameter of the cable dielectric. The log-log taper provides for a uniform axial field as the ground layer of the cable is "peeled off" and also permits the use of a condenser element of one uniform size with a range of cable dimensions. This facilitates normal tolerances of the condenser element and cable dimensions.

As aforedescribed, in this embodiment the segments of the condenser stack 32 are separated by conical shields, such as 38a, 38b, and 38c, whose respective potentials are defined by the grading of the condenser stack. The number of segments included in the condenser stack and the number of shields for proper performance vary with the voltage class of the termination and the ability of the fluid external to the termination to withstand dielectric breakdown. The shields are used to carry the potential defined by the condenser stack to the appropriate positions along the interior surface of the insulating shell in order to grade the exterior surface of the termination to maintain an electric field outside the termination which is sufficiently small. This small field allows reliable functioning of the external dielectric fluid, be it air, $SF_6$, oil or some other gas or liquid, over the anticipated range of operating pressure, temperature, and/or density.

To maintain a constant uniformity of grading, the reactance per unit length of the condenser stack increases as the square of the length of that stack as a result of reactive coupling between the condenser stack and the cable conductor and the inverse relationship between total stack reactance and stack length. Accordingly, the required reactance per unit length of the stack is reduced to a readily usable value; and this high voltage cable termination is practical in application as a result of the small axial length of the condenser stack. Yet, the potential distribution defined by the condenser stack serves to grade the exterior surface of the termination by using the condenser stack to define the potential of one or more conducting shields which carry this potential to the appropriate axial position(s) along the insulating shell of the termination. The shields have a much smaller reactive coupling to the conductor and an increased reactive coupling to ground relative to the condenser stack. As a result thereof, they have a definable effect on the potential distribution along the condenser stack.

It will be appreciated that current flows longitudinally along the condenser stack (from high voltage line 13 to ground shield 28) as well as radially from cable conductor 14 into the condenser stack. This radial current is combined with the longitudinal current and, as is appreciated, radial current components increase near the bottom of the stack and, moreover, accumulate along the length of the stack, resulting in a greater current density near the bottom of the stack than at the top thereof. This may produce non-uniform grading in the dielectric.

The grading of the dielectric field in a laminar cable dielectric may be improved by establishing a varying dielectric constant (i.e. a dielectric constant that varies as a function of axial position) or by using capacitors whose radial thickness varies as a function of axial position. For example, the dielectric constant and/or radial thickness may vary continuously or discretely, with the largest dielectric constant or radial thickness (i.e. reactance per unit length) at the bottom of the condenser assembly. Alternatively, the capacitance of the stack may be made much larger than the dielectric capacitance, resulting in reduced radial currents relative to the longitudinal current.

Figure 4:
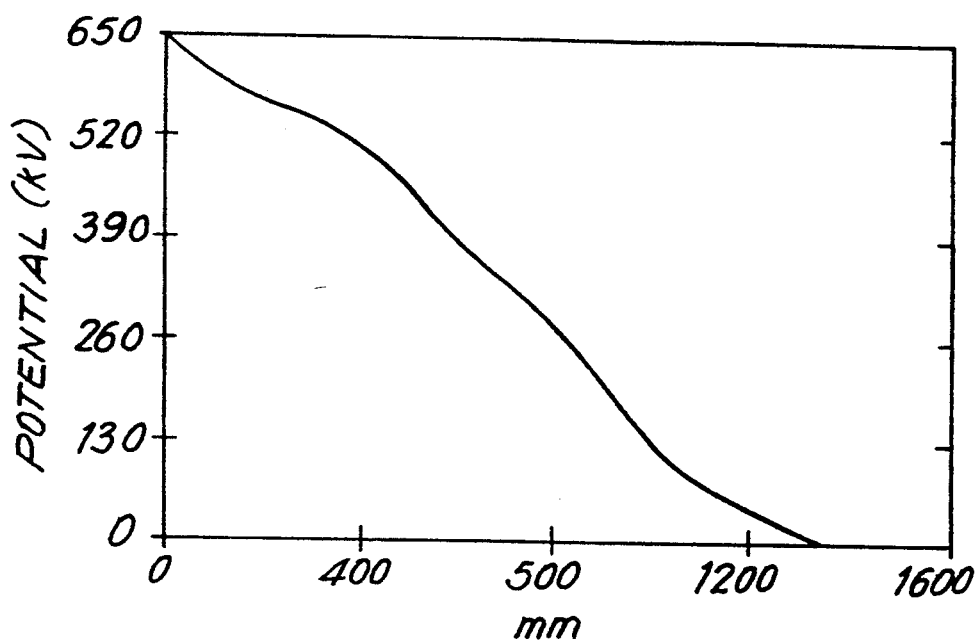
Figure 5:
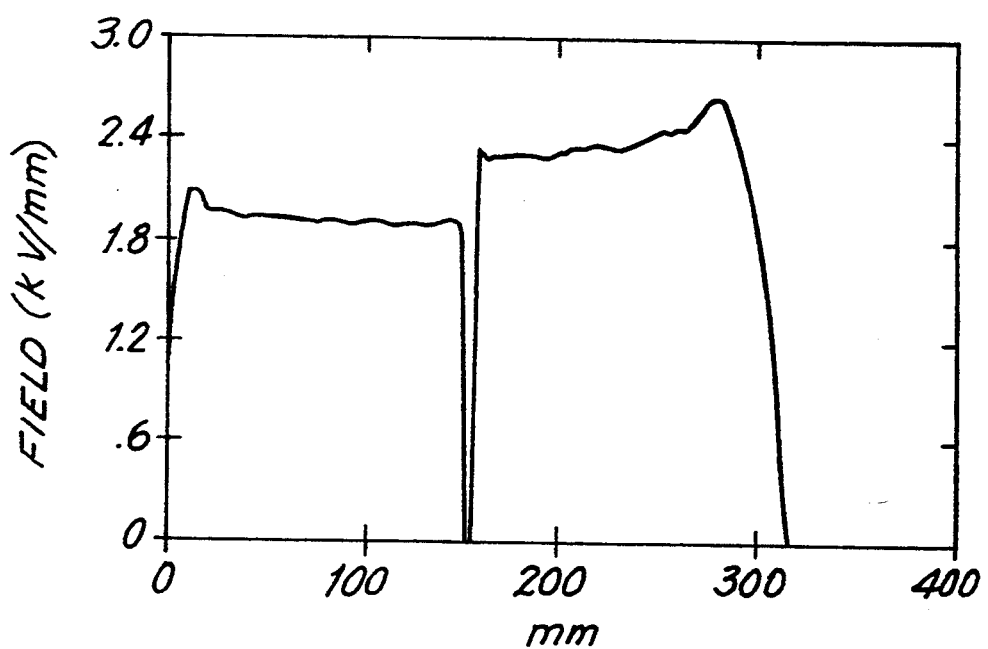

Examples of approximately uniform potential distribution obtained by the present invention are illustrated by cable terminations for use with 138 kV, 230 kV and 345 kV cables. FIG. 2 schematically illustrates the dielectric configuration for a high voltage cable-to-air termination of the type shown in FIG. 1 utilizing a proposed 138 kV termination for a 138 kV cable with PPP dielectric and a 500 kcmil conductor. The dielectric and stress cone have a combined thickness of 14 mm (8 mm for the dielectric and 6 mm for the stress cone), with an average dielectric constant of 3. The condenser stack is formed of two 15 cm long segments with a radial thickness of 10 mm and an effective dielectric constant of approximately 2300. The insulating shell has an inner radius of 80 mm and an effective thickness of 70 mm with a dielectric constant of about 4.5 and is constructed of, for example, polysil. The space between the shell and the condenser stack is filled with oil of dielectric constant 2.4. In this termination, a shield is positioned between the two condenser elements and extends to approximately the center of the shell, which is 1.35 m long. FIGS. 3 and 4 demonstrate the uniform distribution of the electric potential along the insulating shell. FIG. 5 shows that the axial electric field along the condenser grading assembly and, therefore, in the dielectric remains less than 2.7 kV/mm at the BIL rating of the cable. The illustrated discontinuity is caused by the metallic shield which does not support a field.

Figure 6:
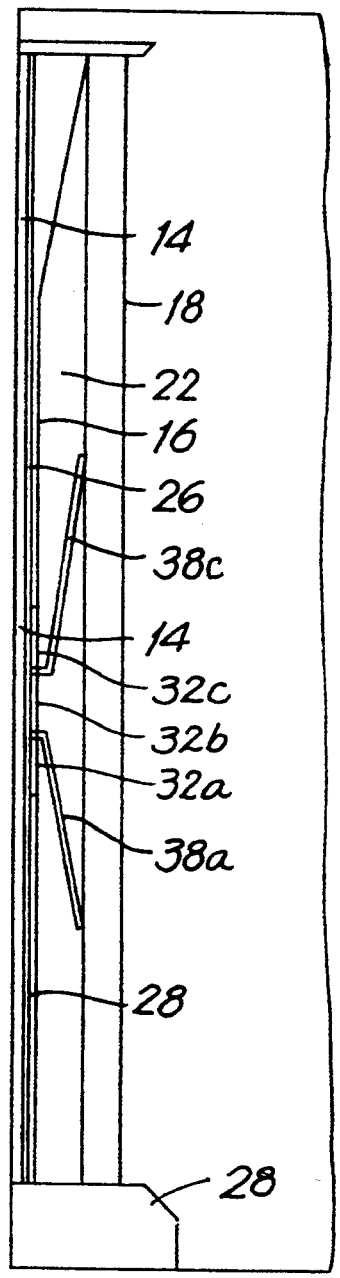
FIG. 6 is a sectional view of another example of the present invention for terminating a 230 kV cable.
Figure 7:
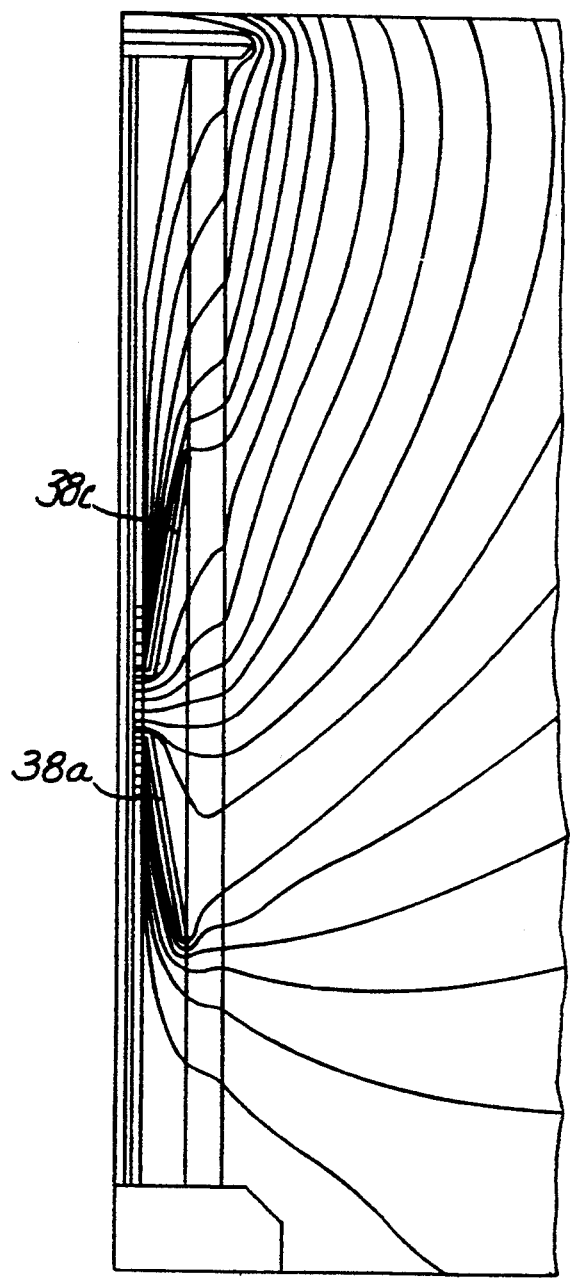
FIGS. 7–9 are graphical representations of field and potential along the cable termination shown in FIG. 6.
Figure 8:
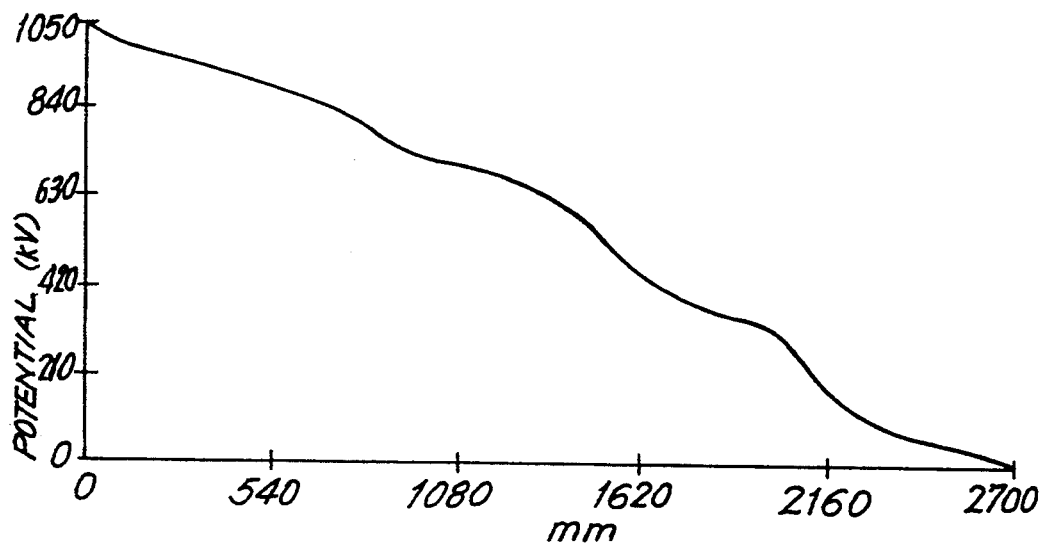
Figure 9:
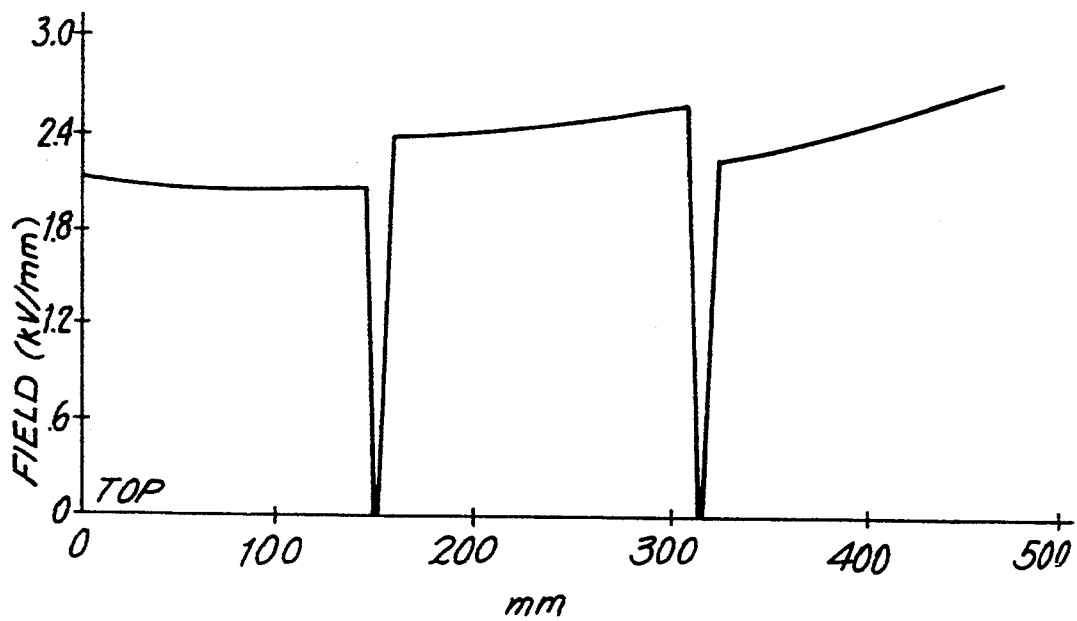

FIG. 6 schematically illustrates another embodiment of the dielectric configuration of a high voltage cable-to-air termination in accordance with the embodiment of FIG. 1, utilizing a 230 kV termination. The design of the 230 kV termination is similar to that of the aforedescribed 138 kV termination except that the 230 kV termination employs three condenser segments and two conical shields. In the 230 kV design as shown, the conductor has a radius of 20 mm (2000 kcmil), while the dielectric and stress cone have a combined thickness of 15 mm and an average dielectric constant of 3. The condensers have a radial thickness of 15 mm and an effective dielectric constant of about 2300. The insulating shell has an inner radius of 130 mm, a thickness of 70 mm and a length of 2.7 m. As shown in FIGS. 7 and 8, a highly uniform distribution of the electric potential along the insulating shell is achieved utilizing the 230 kV high voltage cable termination design of FIG. 1. FIG. 9 shows that the maximum longitudinal electric field along the condenser assembly and, therefore, in the cable dielectric, is in the range of 2.7 kV/mm.

Figure 10:
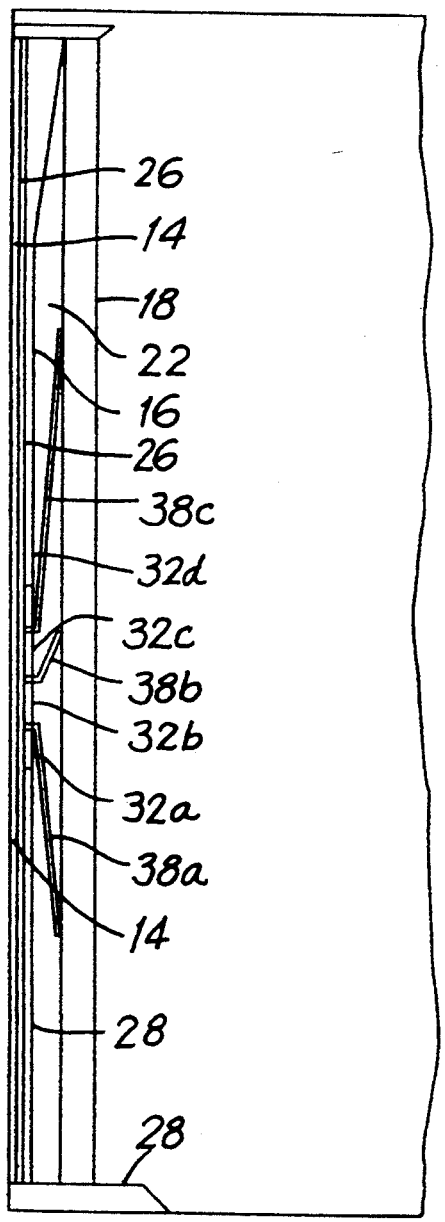
FIG. 10 is a sectional view of a further example of the present invention for terminating a 345 kV cable.
Figure 11:
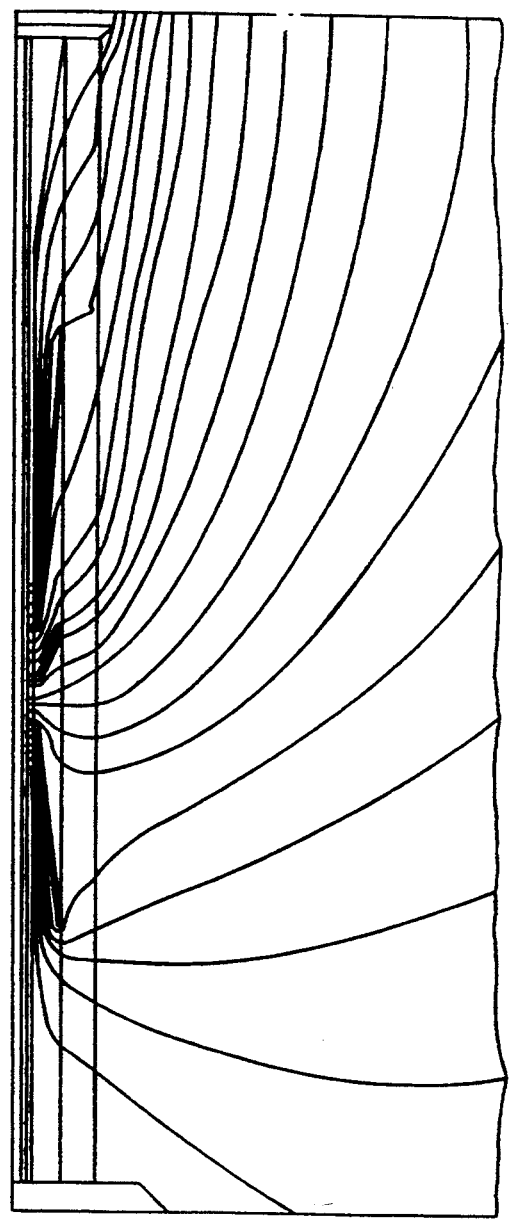
FIGS. 11–13 are graphical representations of field and potential along the cable termination shown in FIG. 10.
Figure 12:
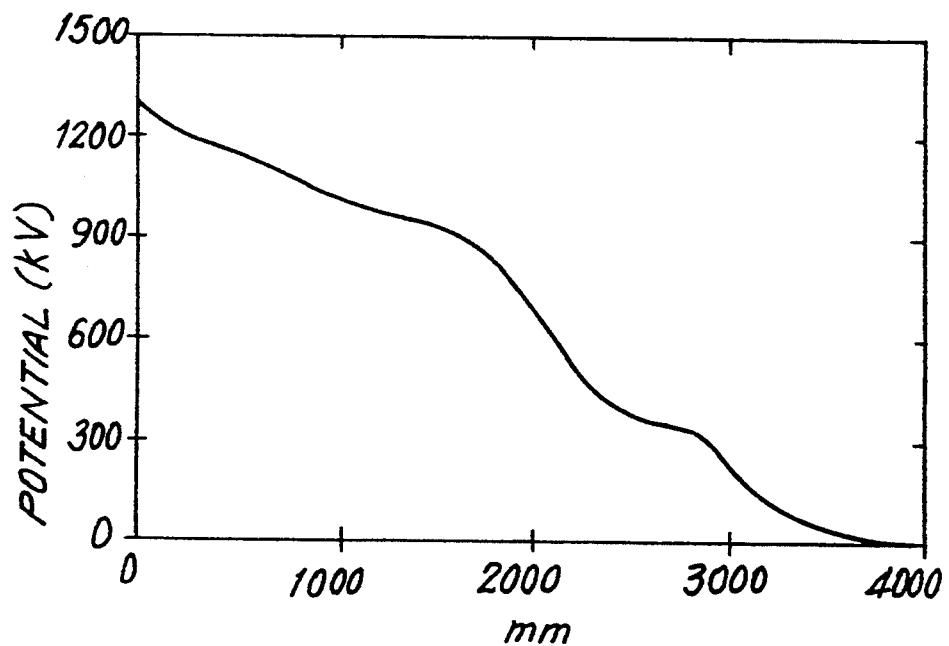
Figure 13:
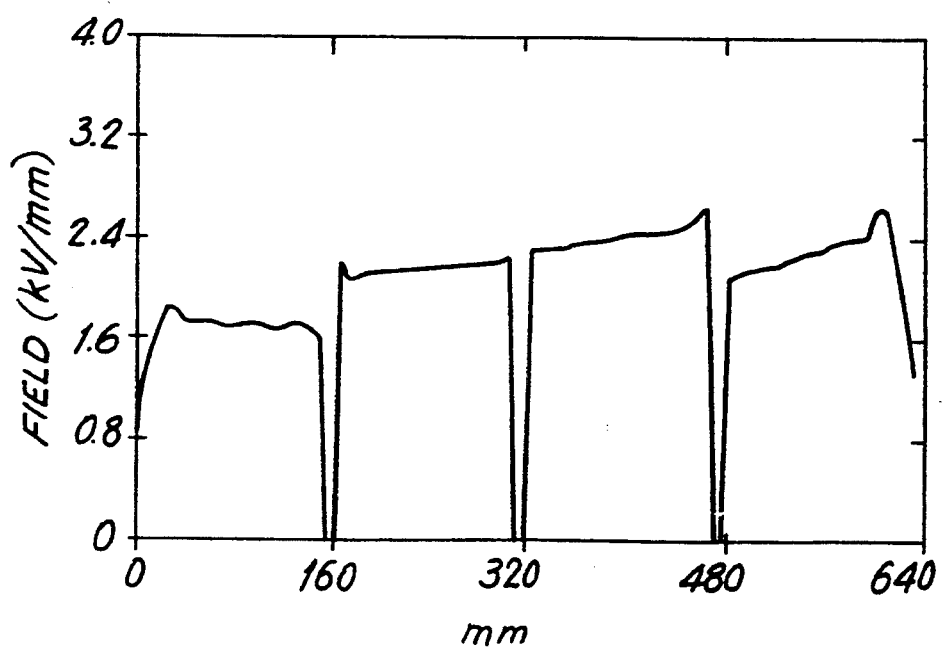

FIG. 10 schematically illustrates yet another example of the dielectric configuration of a high voltage cable-to-air termination in accordance with the embodiment of FIG. 1, utilizing a 345 kV termination. The design of the 345 kV cable-to-air termination is similar to that of the aforedescribed 138 kV and 230 kV terminations except that the 345 kV termination utilizes four condenser segments and three conical shields. In this 345 kV application, the conductor has a radius of 25 mm and the dielectric and stress cone exhibit a combined thickness of about 20 mm (15 mm dielectric plus 5 mm paper roll to fill the gap between the cable dielectric and the condenser stack). Preferably, the condenser elements have a radial thickness of 15 mm and an effective dielectric constant of approximately 2300. The insulating shell has an inner radius of 150 mm, a thickness of 100 mm, and a length of 3.75 m. As shown in FIGS. 11 and 12, a highly uniform distribution of the electric potential along the insulating shell is achieved utilizing the 345 kV high voltage cable termination. FIG. 13 shows that the maximum longitudinal electric field along the condenser assemble and, therefore, in the laminar dielectric, is in the range of 2.7 kV/mm.

Figure 14:
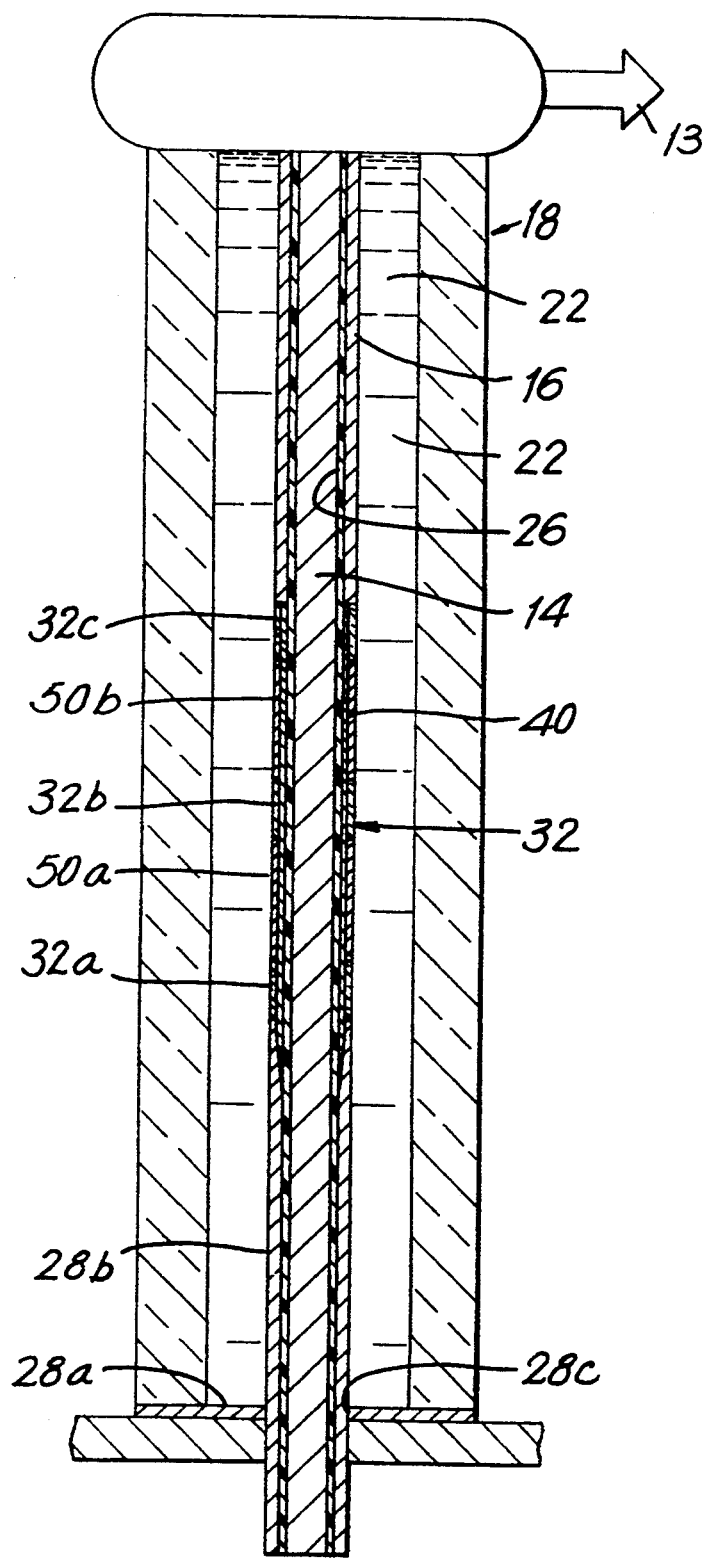
FIG. 14 is a cross-sectional side elevational view of another embodiment of the cable-to-fluid dielectric termination in accordance with the present invention.

Turning now to FIG. 14, in the embodiment shown therein the conical shields are replaced by cylindrical conducting segments 50 which separate the elements of condenser stack 32 axially so as to distribute the electric potential approximately uniformly along the exterior surface of insulating shell 18, with the central condenser element approximately at the axial center of the termination. This embodiment has the advantage of reduced complexity by eliminating the conducting shields of FIG. 1. The larger overall length of the condenser assembly in the embodiment of FIG. 14 results in increased capacitance from the conductor 14 to the condenser assembly 32. As noted above, the total reactance of the condenser assembly should be increased as the square of the assembly length to maintain a constant uniformity of grading. In the illustrated embodiment, the increase in reactance may be held to below the square of the increase in length by using condenser elements of unequal cross sectional area, unequal dielectric constant, or unequal length. Consequently, the maximum longitudinal electric field along each of the condensers in the assembly can be made substantially equal with a total axial capacitance from one end of the condenser assembly to the other which is appreciably less than (e.g., on the order of magnitude of 60% of) the capacitance from conductor 14 to condenser assembly 32. In one example, the capacitances are in the approximate ratio of 0.75:1:1.5, with the largest capacitance in the range of about 1 nF. Grading may be further improved by making each condenser element of tapered cross section or by varying the dielectric constant, with the greatest cross section or dielectric constant positioned toward the bottom of the condenser assembly.

Obviously, the number of condenser elements and separators may be increased from the three condenser elements and two separators shown in FIG. 14. In principle, grading at the external surface of insulating shell 18 improves with an increased number of condenser 18 elements over a fixed length of grading structure. Improvement also is obtained by spreading a greater number of condenser elements over a greater axial length; however, this will generally require larger capacitances per element to maintain the same quality of axial grading long the condenser elements.

Figure 15:
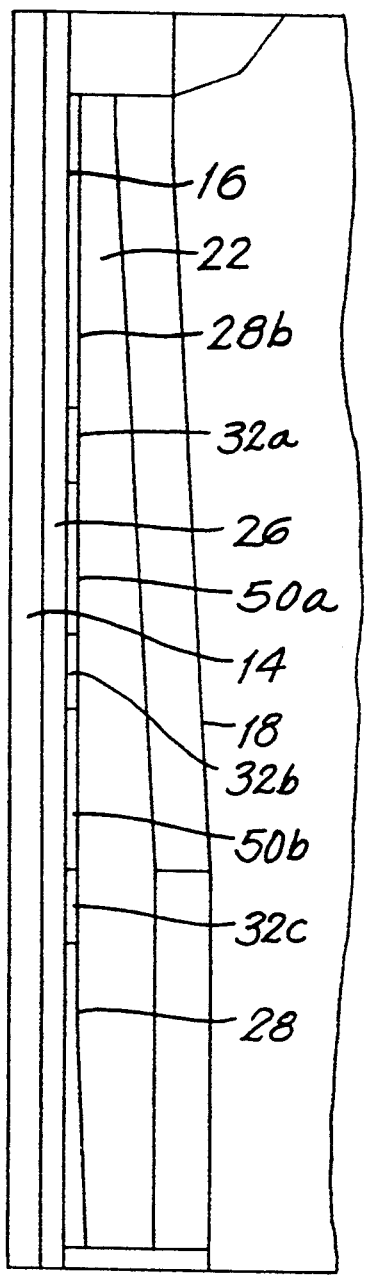
FIG. 15 is a sectional view of a particular dielectric configuration of the FIG. 14 embodiment for terminating a 138 kV cable.

Examples of the uniform grading of the potential achieved by the embodiment of FIG. 14 are demonstrated by the cable terminations set forth below. FIG. 15 illustrates a basic dielectric configuration for a 138 kV cable-to-air termination in accordance with the embodiment of FIG. 14, with insulating shell 18 being tapered. The termination uses a 3000 kcmil paper cable dielectric and a conductor of 27 mm radius. The dielectric and stress cone have a combined thickness of 18 mm (13 mm for the dielectric and 5 mm for the stress cone), with an average dielectric constant of 3. The condenser stack is comprised of three segments, each having a length of 10 cm, a radial thickness of 10 mm and an effective dielectric constant of about 2300. The inner radius of insulating shell 18 is 12 cm at the base tapering to 7 cm over a length of 1.5 m, and the shell has an effective insulating thickness of 50 mm with a dielectric constant of 6.5 (e.g., the shell may be made of porcelain). The space between the shell and the condenser stack is filled with oil of dielectric constant 2.1.

Figure 16:
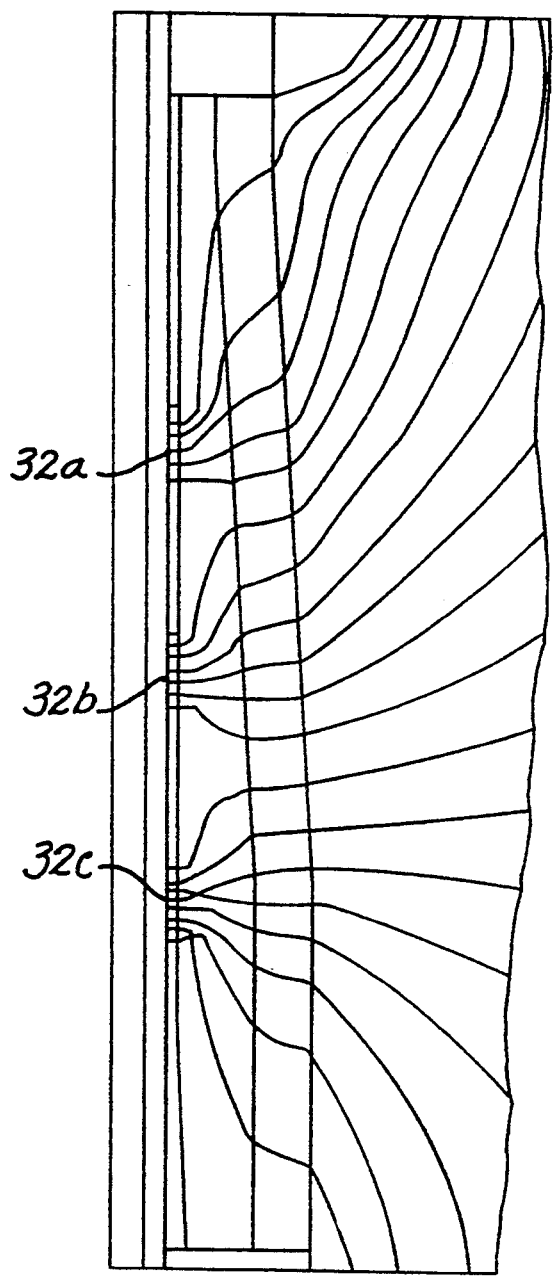
FIGS. 16–18 are graphical representations of field and potential along the cable termination shown in FIG. 15.
Figure 17:
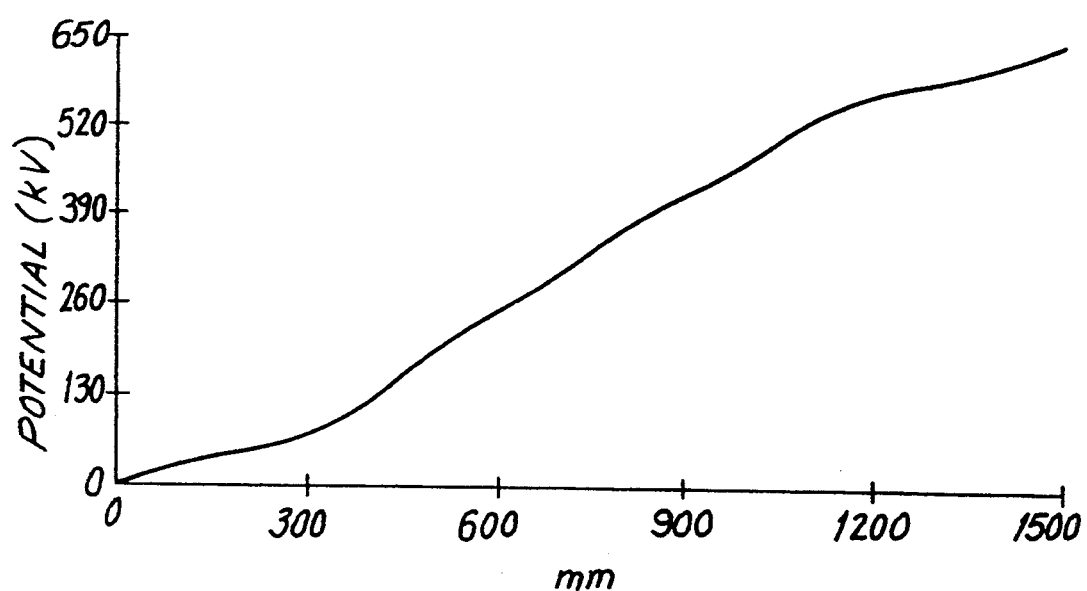
Figure 18:
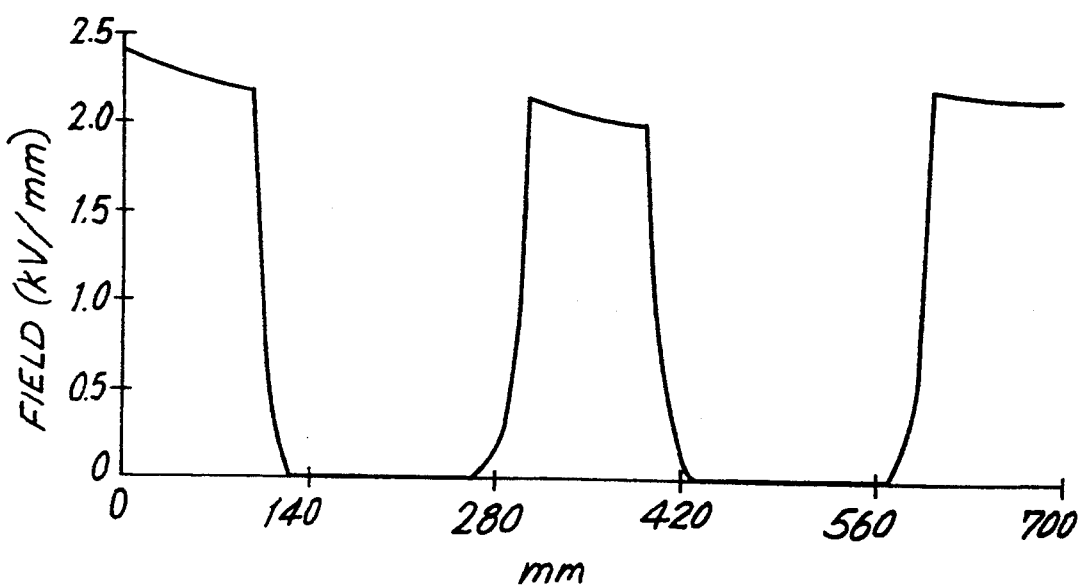

Even though the termination is not provided with the conical shields of FIG. 1, FIGS. 16 and 17 demonstrate that a high degree of uniformity of the external potential along the insulating shell is achieved, while FIG. 18 shows that the axial field in the laminar dielectric remains below 2.7 kV/mm at the BIL of 650 kV.

FIG. 19 illustrates another dielectric configuration for a 230 kV cable-to-air termination in accordance with the embodiment of FIG. 14. The design of the 230 kV termination is similar to that of the 138 kV termination except that in the 230 kV design, the conductor has a radius of 27 mm (3000 kcmil), while the paper dielectric and paper stress cone have a combined thickness of 23 mm and a dielectric constant of 3.6. The condenser stack may be formed of three condensers having radial thicknesses which vary from 10 mm for the top condenser to 18 mm for the bottom condenser. Each condenser has an effective dielectric constant of approximately 2300 and a length of 150 mm. The inside radius of the insulating shell is 130 mm and the shell has an effectiveness thickness of 90 mm and a length of 2 m.

Figure 21:
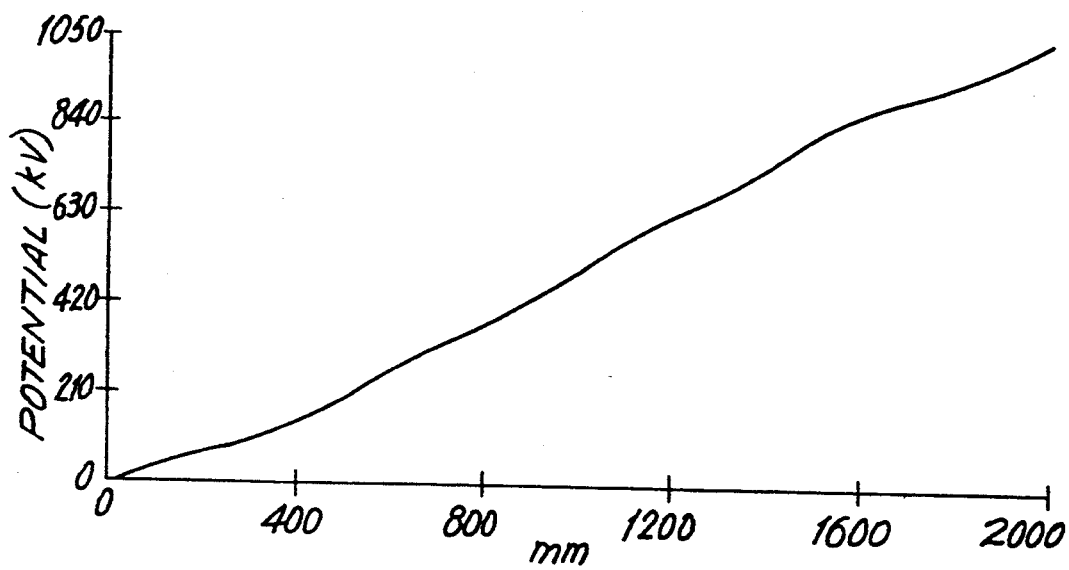
Figure 22:
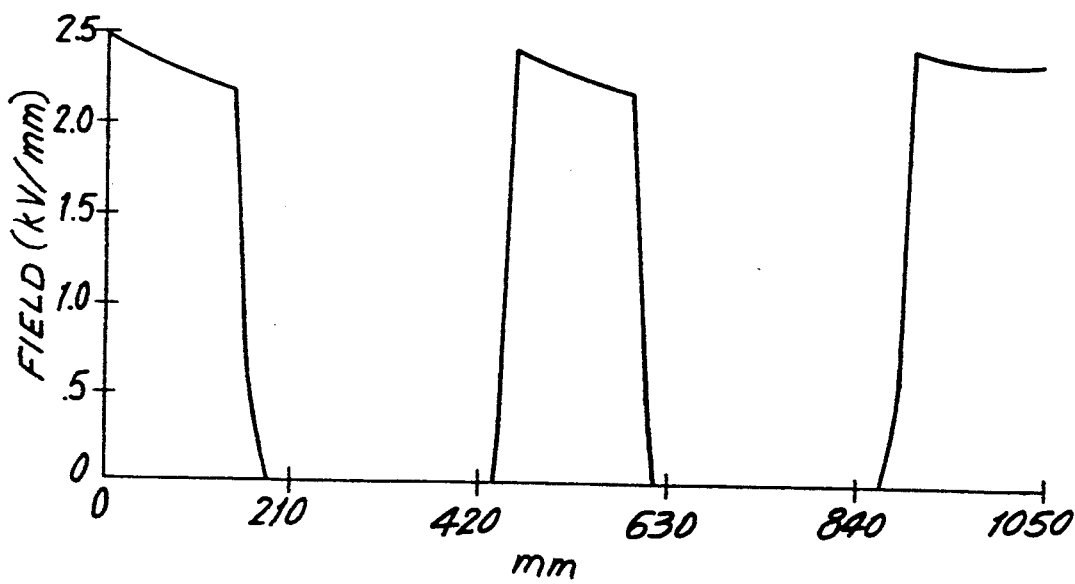

As shown in FIGS. 20–22, a high degree of uniformity of the external potential field along the insulating shell is achieved utilizing this 230 kV high voltage cable termination design, and the maximum .longitudinal electric field along the condenser grading assembly and, therefore, in the laminar dielectric, remains below 2.7 kV/mm at the BIL of 1050 kV.

Figure 23:
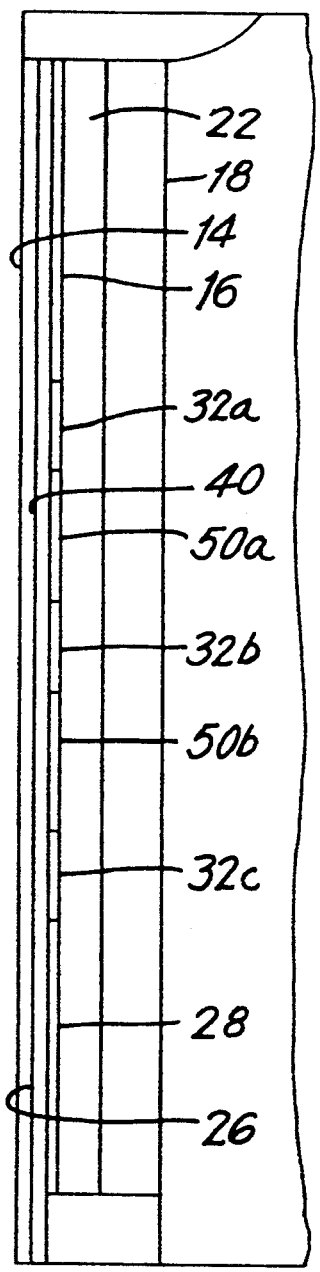
FIG. 23 is a sectional view of a further example of a dielectric configuration of the FIG. 14 embodiment for terminating a 345 kV cable.

FIG. 23 shows a further dielectric configuration for a 345 kV cable-to-air termination in accordance with the embodiment of FIG. 14. The design of the 345 kV cable-to-air termination is similar to that of the 138 kV and 230 kV terminations. In this 345 kV termination, the conductor has a radius of 27 mm and the combined thickness of the cable dielectric plus stress cone semipennant is 20 mm (15 mm for the dielectric plus 5 mm for the paper roll to fill the gap between the cable dielectric and the condenser stack). The condenser stack is illustrated with three condenser segments, each having a length of 200 mm, a radial thickness which varies from 10 mm for the top condenser to 18 mm for the bottom condenser and an effective dielectric constant of about 2300. The insulating shell has an inner diameter of 280 mm, a thickness of 95 mm, and a length of 2.5 meters. Other parameters are similar to those discussed above for the lower voltage terminations.

Figure 24:
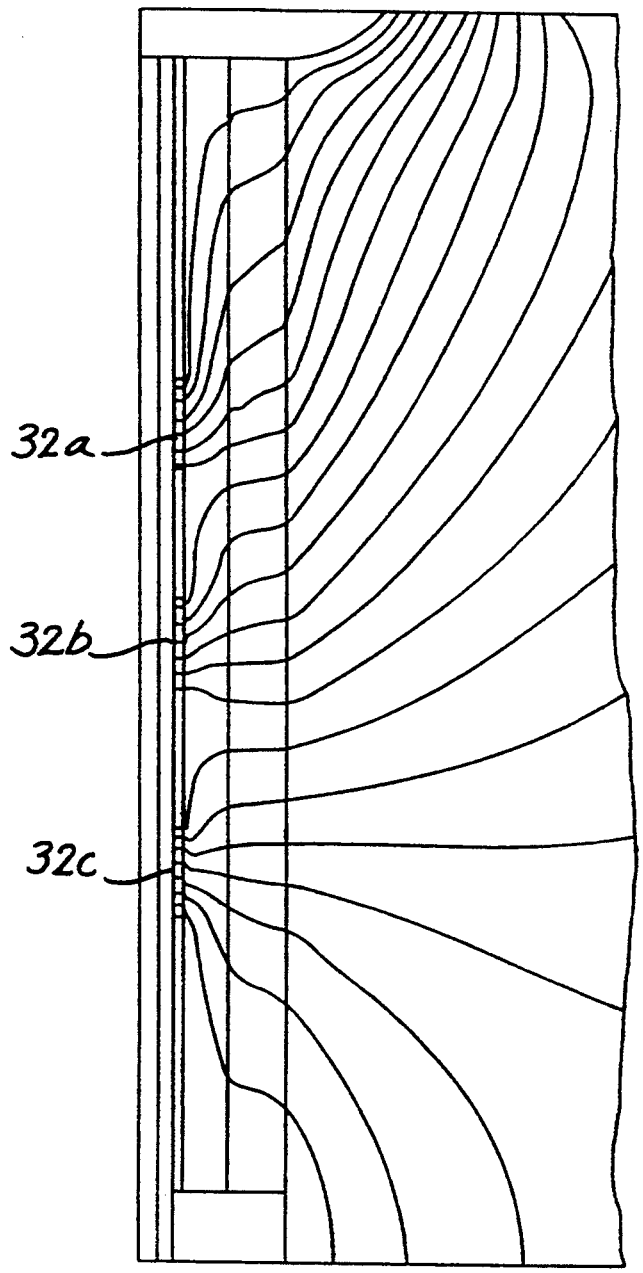
FIGS. 24–26 are graphical representations of field and potential along the cable termination shown in FIG. 23.
Figure 25:
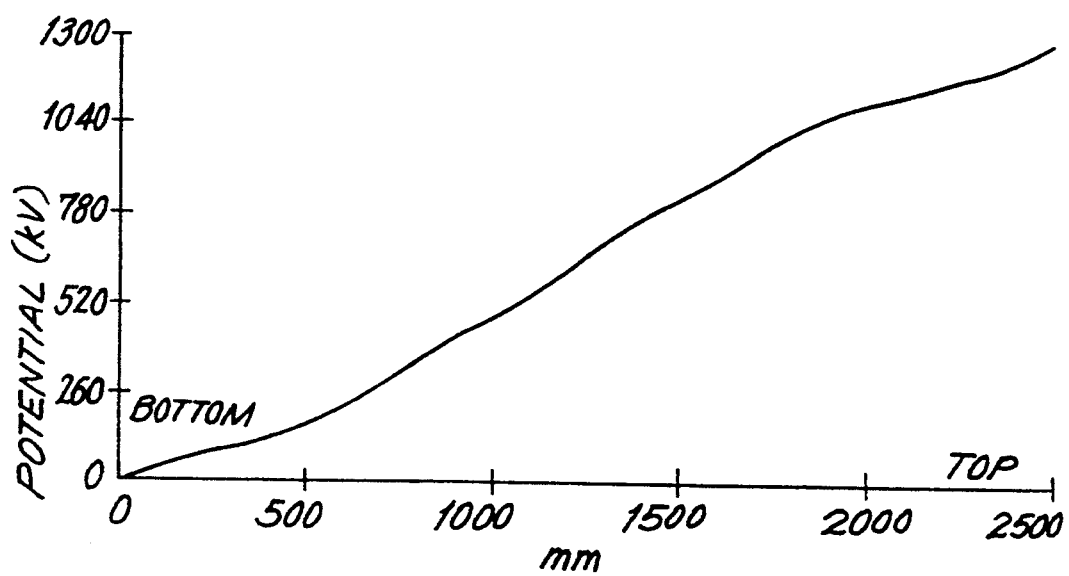
Figure 26:
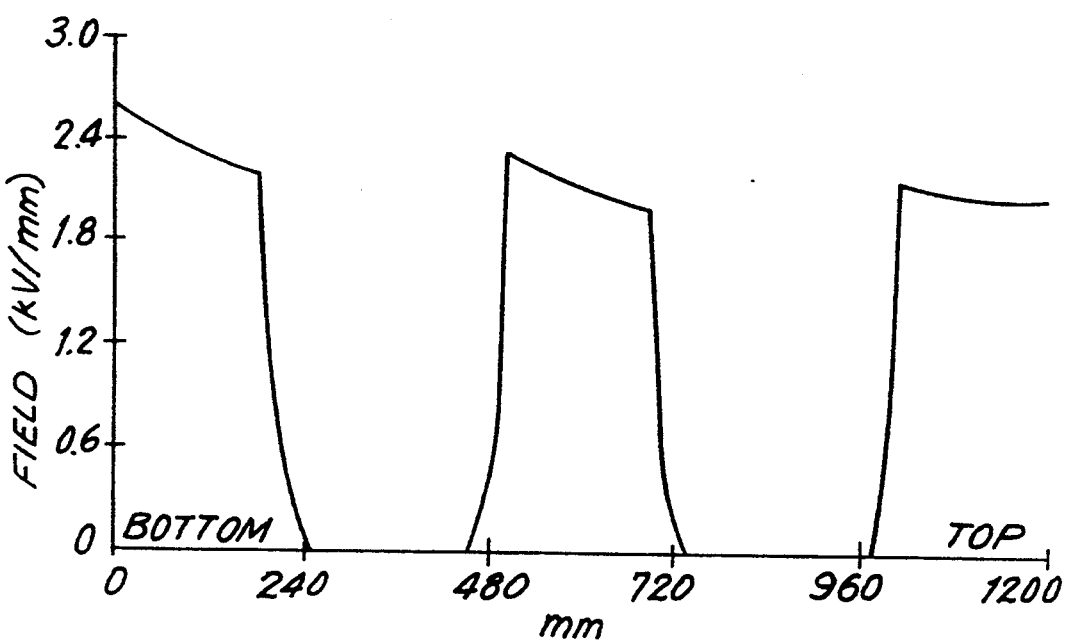

As shown in FIGS. 24–26, a high degree of uniformity of the external potential along the insulating shell is achieved utilizing this 345 kV high voltage cable termination, and the maximum longitudinal electric field along the condenser grading assembly and, therefore, in the laminar dielectric is below 2.7 kV/mm at the BIL of 1300 kV.

The foregoing examples demonstrate that a single condenser grading stack within the termination can be used to effect grading along the external surface of the insulating shell. Consequently, the external condenser stack heretofore used for this purpose in terminations of this type is eliminated.

The present invention is not limited to a termination disposed in air. Indeed, the dielectric configuration can be extended to fluid media other than air, such as SF$_6$, oil, etc. In the case of media with a higher ability to withstand dielectric breakdown than air, the length of the outer termination enclosure may be reduced, as would the number of shields (in the FIG. 1 embodiment) and the number of condenser segments (in the FIG. 14 embodiment) required for acceptable field grading at the external surface of the enclosure.

In summary, the present invention provides a high voltage cable termination having a common condenser stack of restricted length which grades the internal electric field and also grades the electric field external to the termination. When conductive shields are used, each of these shields taps proportionate different voltages produced along the condenser stack to locations along the insulating shell so as to grade the external electric field and thereby prevent breakdown of the air or other dielectric in which the termination is disposed. When a distributed condenser stack is used, such as the FIG. 14 embodiment wherein condenser elements are axially separated by conducting segments, the physical position of the condenser elements along the stack distributes the potential so as to obtain a nearly uniform potential distribution along the external surface of the insulating shell while maintaining a maximum longitudinal electric field below 2.7 kV/mm (at the BIL) along the condenser elements and in the cable and stress cone dielectric. In general, the grading interval (i.e. the number of different voltages produced by the condenser stack to grade the external field) may be thought of as V/n, where n is the number of condenser segments and V is the voltage rating of the cable. Stated otherwise, the grading interval may be expressed as 1/(m+1) where m is the number of grading shields used.

While the invention has been particularly shown and described with reference to preferred embodiments, it will be readily appreciated by those of ordinary skill in the art that various changes and modifications may be made therein without departing from the spirit and scope of the invention. For instance, the outer cylindrical conductive member 16 connected to the overhead line can be tapered. Additionally, high voltage from the overhead line can be coupled to the outer cylindrical conductive member 16, and then the inner cylindrical conductive 14 of the underground cable can be connected to the outer cylindrical conductive member 16. For very high current applications where cooling is quite important, the cable dielectric above the condenser stack may be eliminated so that cylindrical conductive member 16 fits directly over the cable conductor 14 thereby increasing substantially the heat transfer from the cable conductor to the fluid (e.g. oil) within the termination through elimination of the appreciable thermal resistance represented by the cable dielectric. It will be appreciated that the primary purposes of this outer cylindrical conductive member are to make electrical contact with the top of the condenser stack and keep the flexible cable straight.

It is intended that the appended claims be interpreted as including the foregoing as well as various other such changes and modifications.

What is claimed is:

1. A high voltage cable termination for an insulated high voltage cable of the type having internal and external electric fields, the high voltage cable termination comprising:
   a high voltage conductor and an insulating shell surrounding the conductor; and
   common condenser means for grading the internal electric field in a dielectric surrounding the high voltage conductor and for grading the external electric field along said insulating shell and in a surrounding environment, said common condenser means being comprised of elements formed of material to produce a generally continuously changing potential therein, and including a cylindrical condenser stack of restricted length surrounding the high voltage conductor, said common condenser means further including conductive shields connected between said condenser stack and said insulating shell to grade the external electric field along said insulating shell and in the surrounding environment.

2. The high voltage cable termination as set forth in claim 1 wherein said conductive shields are formed of a plurality of generally conical shields whose electrical potentials are defined by the grading of said condenser stack.

3. A high voltage cable termination for an insulated high voltage cable of the type having internal and external electric fields, the high voltage cable termination comprising:
   a high voltage conductor and an insulating shell surrounding the conductor; and
   common condenser means including a cylindrical condenser stack of restricted length surrounding the high voltage conductor which grades the internal electric field in a dielectric surrounding the high voltage conductor, and conductive shields connected between said condenser stack and said insulating shell to grade the external electric field along said insulating shell and in a surrounding environment, said conductive shields being formed of a plurality of generally conical shields whose electrical potentials are defined by the grading of said condenser stack and wherein each of said conical shields taps a proportionate different voltage produced along said condenser stack to locations along said insulating shell so as to grade the external electric field.

4. The high voltage cable termination as set forth in claim 3 wherein said condenser stack is formed of n segments and each conical shield taps a respective multiple of approximately 1/n the conductor voltage.

5. The high voltage cable termination as set forth in claim 4 wherein one of said conical shields taps approximately 75% of the conductor voltage to a location that is approximately three-fourths the length of said insulating shell.

6. The high voltage cable termination as set forth in claim 4 wherein one of said conical shields taps approximately 50% of the conductor voltage to a location that is approximately one-half the length of said insulating shell.

7. The high voltage cable termination as set forth in claim 4 wherein one of said conical shields taps approximately 25% of the conductor voltage to a location that is approximately one-quarter the length of said insulating shell.

8. The high voltage cable termination as set forth in claim 4 wherein one of said conical shields taps approximately 67% of the conductor voltage to a location that is approximately two-thirds the length of said insulating shell.

9. The high voltage termination as set forth in claim 8 wherein another of said conical shields taps approximately 33% of the conductor voltage to a location that is approximately one-third the length of said insulating shell.

10. A high voltage cable termination for an insulated high voltage cable of the type having internal and external electric fields, the high voltage cable termination comprising:
 a high voltage conductor and an insulating shell surrounding the conductor; and
 a cylindrical condenser stack of restricted length surrounding the high voltage conductor for grading the internal electric field in a dielectric surrounding the high voltage conductor and for grading the external electric field along said insulating shell and in a surrounding environment, said cylindrical condenser stack being comprised of plural condenser elements formed of ceramic to produce a generally continuously changing potential therein and distributed along said high voltage conductor and spaced apart longitudinally from each other by conducting segments.

11. The high voltage cable termination as set forth in claim 10 further including a cable dielectric surrounding the conductor along the length thereof.

12. The high voltage cable termination as set forth in claim 11 wherein a cable ground shield is mounted at one end of said insulating shell and surrounds a portion of said conductor.

13. The high voltage cable termination as set forth in claim 12 further including a paper roll concentrically disposed between said cable dielectric and said condenser stack to size said cable ground shield to the inside diameter of said condenser stack.

14. The high voltage cable termination as set forth in claim 10 wherein respective condenser elements exhibit different cross sectional areas.

15. The high voltage cable termination as set forth in claim 10 wherein each condenser element is provided with a dielectric, and respective condenser elements exhibit different dielectric constants.

16. The high voltage cable termination as set forth in claim 10 wherein respective condenser elements exhibit different axial lengths.

17. The high voltage cable termination as set forth in claim 10 wherein each condenser element is provided with a dielectric of varying dielectric constant.

18. The high voltage cable termination as set forth in claim 17 wherein that portion of a condenser element having the larger dielectric constant is positioned toward the bottom of said stack.

19. The high voltage cable termination as set forth in claim 10 wherein each condenser element exhibits a tapered cross sectional area.

20. The high voltage cable termination as set forth in claim 19 wherein that portion of the condenser element having the larger cross sectional area is positioned toward the bottom of said stack.

21. The high voltage cable termination of claim 10 wherein said ceramic has a high effective dielectric constant.

22. A high voltage cable termination for an insulated high voltage cable of the type having internal and external electric fields, the high voltage cable termination comprising:
 a high voltage conductor and an insulating shell surrounding the conductor;
 a dielectric providing surrounding insulation for the conductor; and
 a common condenser stack for grading electric fields produced by the conductor, said condenser stack being cylindrical and of restricted length surrounding the high voltage conductor to grade the electric field within said dielectric, and conductive shields connected between said condenser stack and said insulating shell to grade the external electric field between said insulating shell and surrounding environment.

23. The high voltage cable termination as set forth in claim 22 wherein said conductive shields are formed of a plurality of generally conical shields whose electrical potentials are defined by the grading of said condenser stack.

24. A high voltage cable termination for an insulated high voltage cable of the type having internal and external electric fields, the high voltage cable termination comprising:
 a high voltage conductor and an insulating shell surrounding the conductor;
 a dielectric providing surrounding insulation for the conductor; and a common condenser stack for grading electric fields produced by the conductor, said condenser stack being cylindrical and of restricted length surrounding the high voltage conductor to grade the electric field within said dielectric, and conductive shields connected between said condenser stack and said insulating shell to grade the external electric field between said insulating shell and surrounding environment, said conductive shields being formed of a plurality of generally conical shields whose electrical potentials are defined by the grading of said condenser stack and wherein each of said conical shields taps proportionate different voltages produced along said condenser stack to a respective location along said insulating shell so as to grade the external electric field.

25. The high voltage cable termination as set forth in claim 24 wherein one of said conical shields taps approximately 75% of the maximum conductor voltage to a location that is approximately three-fourths the length of said insulating shell.

26. The high voltage cable termination as set forth in claim 24 wherein one of said conical shields taps approximately 50% of the maximum conductor voltage to a location that is approximately one-half the length of said insulating shell.

27. The high voltage cable termination as set forth in claim 24 wherein one of said conical shields taps approximately 25% of the maximum conductor voltage to a location that is approximately one-quarter the length of said insulating shell.

28. The high voltage cable termination as set forth in claim 24 wherein one of said conical shields taps approximately 33% of the maximum conductor voltage to a location that is approximately one-third the length of said insulating shell.

29. A cable termination of the type having internal and external electric fields comprising:

dual conductors composed of an inner cylindrical conductive member and an outer cylindrical conductive member surrounding said inner cylindrical conductive member along a portion thereof;
an insulating shell surrounding said dual conductors;
a cable dielectric disposed between said inner and outer cylindrical conductive members; and
common condenser means for grading electric fields produced by the dual conductors, said common condenser means including a cylindrical condenser stack of restricted length surrounding said inner cylindrical conductive member and axially spaced from said outer cylindrical conductive member for grading of the electric field within said cable dielectric, and conductive shields connected between said condenser stack and said insulating shell for grading an external electric field between said insulating shell and surrounding environment.

30. The cable termination as set forth in claim 29 further comprising a cylindrical ground member surrounding a portion of said inner cylindrical conductive member, said cylindrical ground member being axially spaced from said outer cylindrical conductor member, and said condenser stack being positioned between said cylindrical ground member and said outer cylindrical conductive member.

31. The cable termination as set forth in claim 29 further comprising a cable ground shield mounted at one end of said insulating shell.

32. The cable termination as set forth in claim 31 further comprising a paper roll concentrically disposed between said cable dielectric and said condenser stack to size said cable ground shield to the inside diameter of said condenser stack.

33. The cable termination as set forth in claim 29 wherein said conductive shields are formed of a plurality of generally conical shields whose electrical potentials are defined by the grading of said condenser stack.

34. The cable termination as set forth in claim 33 wherein each said conical shield taps a proportionate different voltage produced along said condenser stack to a respective location along said insulating shell so as to grade the external electric field.

35. A high voltage cable termination for an insulated high voltage cable of the type having internal and external electric fields, the high voltage cable termination comprising:
a high voltage conductor and an insulating shell surrounding the conductor;
a dielectric providing surrounding insulating for the conductor; and
a common condenser stack for grading electric fields produced by the conductor, said condenser stack being cylindrical and comprised of axially distributed condenser elements formed of ceramic to produce a generally continuously changing potential therein and separated by conductive segments, the condenser stack surrounding the high voltage conductor to grade the internal electric field within said dielectric and to grade the external electric field between said insulating shell and surrounding environment.

36. The termination of claim 35 wherein said condenser elements include a central condenser element located approximately at an axially central position of said termination.

37. The high voltage cable termination of claim 35 wherein said ceramic has a high effective dielectric constant.

38. A high voltage cable termination for an insulated high voltage cable of the type having internal and external electric fields, the high voltage cable termination comprising:
a high voltage conductor and an insulating shell surrounding the conductor; and
a cylindrical condenser stack of restricted length surrounding the high voltage conductor for grading the internal electric field in a dielectric surrounding the high voltage conductor and for grading the external electric field along said insulating shell and in a surrounding environment, said cylindrical condenser stack being comprised of plural condenser elements formed as respective stack layer film condensers to produce a generally continuously changing potential therein and distributed along said high voltage conductor and spaced apart longitudinally from each other by conducting segments.

* * * * *